United States Patent
Cao et al.

(10) Patent No.: US 9,075,161 B2
(45) Date of Patent: Jul. 7, 2015

(54) CRITICAL REFLECTION ILLUMINATIONS ANALYSIS

(71) Applicant: CONOCOPHILLIPS COMPANY, Houston, TX (US)

(72) Inventors: Jun Cao, Katy, TX (US); Joel D. Brewer, Houston, TX (US); Xianhuai Zhu, Sugar Land, TX (US)

(73) Assignee: ConocoPhillips Company, Houston, TX (US)

( * ) Notice: Subject to any disclaimer, the term of this patent is extended or adjusted under 35 U.S.C. 154(b) by 444 days.

(21) Appl. No.: 13/718,159

(22) Filed: Dec. 18, 2012

(65) Prior Publication Data
US 2013/0155814 A1      Jun. 20, 2013

Related U.S. Application Data

(60) Provisional application No. 61/578,146, filed on Dec. 20, 2011.

(51) Int. Cl.
*G01V 1/34* (2006.01)
*G01V 1/30* (2006.01)

(52) U.S. Cl.
CPC ............... *G01V 1/345* (2013.01); *G01V 1/301* (2013.01); *G01V 1/303* (2013.01); *G01V 2200/14* (2013.01)

(58) Field of Classification Search
CPC ....... G01V 1/003; G01V 1/301; G01V 1/303; G01V 1/345; G01V 2210/14
USPC .............................. 367/36–38, 73; 702/16, 18
See application file for complete search history.

(56) References Cited

U.S. PATENT DOCUMENTS

| | | | | |
|---|---|---|---|---|
| 5,083,297 | A * | 1/1992 | Ostrander | 702/18 |
| 5,587,968 | A * | 12/1996 | Barr | 367/75 |
| 5,629,904 | A * | 5/1997 | Kosloff et al. | 702/18 |
| 7,230,879 | B2 * | 6/2007 | Herkenhoff et al. | 702/17 |
| 8,537,637 | B2 * | 9/2013 | Laake | 367/54 |
| 2008/0162051 | A1 * | 7/2008 | Ikelle | 702/14 |
| 2011/0267921 | A1 * | 11/2011 | Mortel et al. | 367/25 |
| 2011/0292767 | A1 * | 12/2011 | Dai | 367/73 |
| 2012/0043091 | A1 * | 2/2012 | Leahy et al. | 367/73 |

OTHER PUBLICATIONS

Boore, D.M., "Finite-difference methods for seismic waves", In: Methods in Computational Physics, 1972, vol. 11, 1-37.
(Continued)

*Primary Examiner* — Ian J Lobo
(74) *Attorney, Agent, or Firm* — ConocoPhillips Company

(57) ABSTRACT

The illumination/imaging of a theorized target horizon that is below a theorized velocity contrast horizon where the velocity contrast horizon may represent the bottom of a salt dome by assessing the path of seismic energy for critical angle reflection/refraction and tabulates the successful paths and unsuccessful paths. For some subsurface locations, seismic energy will not reach the surface above the velocity contrast due to the shapes of the velocity contrast horizon and target horizon and the velocity model through which the studied waves propagate. Displays may be prepared and used for understanding illumination/imaging of the geology for drilling, reacquisition, and reprocessing to elicit information about subsurface geology that may have been overlooked or ignored. Future surveys avoid expensive surveying which cannot obtain useful seismic data as determined by the velocity contrast for the target locations due to the shapes of the horizons and the velocity model.

19 Claims, 2 Drawing Sheets

(56) References Cited

OTHER PUBLICATIONS

Kelly, K.R., et al., "Synthetic Seismograms: a Finite-Difference Approach," 1976, Geophysics, 41, 2-27.

Baysal, E., et al., "Reverse-time migration", 1983, Geophysics, 48, 1514-1524.

McMechan, G.A., "Migration by extrapolation of time-dependent boundary values," 1983, Geophysical Prospecting, 31, 413-420.

Whitmore, D.N., "Iterative depth imaging by back time propagation", 1983, 53rd Annual International Meeting, SEG, Expanded Abstracts, 382-385.

\* cited by examiner

CRITICAL REFLECTION ILLUMINATIONS ANALYSIS

CROSS-REFERENCE TO RELATED APPLICATIONS

This application is a non-provisional application which claims benefit under 35 USC §119(e) to U.S. Provisional Application Ser. No. 61/578,146 filed Dec. 20, 2011, entitled "CRITICAL REFLECTION ILLUMINATION ANALYSIS," which is incorporated herein in its entirety.

STATEMENT REGARDING FEDERALLY SPONSORED RESEARCH

None.

FIELD OF THE INVENTION

This invention relates to the analysis of earth formations and especially to the analysis of the propagation of seismic energy through earth formations.

BACKGROUND OF THE INVENTION

In the process of exploring for hydrocarbon resources, seismic prospecting produces considerable data in the form of squiggles and echoes. Processing and interpreting the data to develop an understanding of the shape and contours of the earth formations requires considerable skill and experience, but still produces considerable ambiguity and uncertainty.

One area of uncertainty and ambiguity is at the bottom portions of high velocity layers such as salt, basalt, etc. where lower velocity sediments underlie the high velocity layers. Salt domes, for example, tend to transmit seismic energy very fast. Other materials typically transmit seismic energy comparatively slower. It is also generally believed, especially as it relates to the Gulf of Mexico, that there are many large, high velocity formations overlying significant volumes of hydrocarbon bearing sediments. Unfortunately, the high velocity layers create significant challenges for geoscientists to confidently resolve prospects for hydrocarbon production. The challenge arises mainly because seismic energy is refracted as it crosses ordinary geological interfaces according to Snell's law. However, when seismic energy crosses interfaces with high velocity materials on one side and much lower velocity materials (comparatively) on the other, the refraction is greatly exaggerated. With exaggerated refraction occurring at these boundaries or interfaces, substantial dip angles essentially prevent useful seismic energy from being acquired and/or processed in a conventional manner. Essentially, the orientation of the high/low velocity interface and the velocity contrast there as they relate to the path of the seismic energy can easily deflect the seismic energy such that very little energy arrives at any location above that interface for detection.

It should also be understood that the interfaces beneath the bottom of the salt tend to be highly irregular and convoluted. With substantial complexity and exaggerated affect, salt domes and other high velocity geologies are quite problematic for seismic prospecting. The seismic data records for such areas often show no data, and therefore no interface imaged by them between highly distinct geological layers. The absence of such data is particularly perplexing if there are indications that hydrocarbons could potentially be pooling in one or more locations somewhere along a very broad area in one or more geological formations but hidden below the high velocity layer.

In the past, those involved with hydrocarbon exploration simply avoided subsalt formations. While it is believed that considerable hydrocarbon resources may underlie many salt domes in the Gulf of Mexico, the cost of drilling wells offshore, and especially in deep water, is far too expensive to take such blind risks. Considerable information is desired and analysis is performed to reduce the risk of drilling very expensive dry holes. Even with very good information, more dry holes are drilled than profitable wells so the expense and effort to reduce risk is clearly justified.

As more seismic data is collected in the Gulf of Mexico, the size and locations of salt domes are known and more can be gleaned as to the shapes of the perimeter and near perimeter bottoms of the salt domes. Information that reveals the shape of the bottom of the salt domes make it possible to understand what is happening to the seismic energy transiting through the salt domes and other high velocity layers and may allow better understanding of the formations under such salt domes. With better understanding of the shapes of salt domes, it becomes more practical to investigate promising subsalt prospects with additional seismic or other investigative techniques. However, additional seismic and/or re-processing of existing data is expensive, and can end up not providing any helpful information. Knowing what information is available from each of various techniques, a simple cost benefit analysis may be performed to determine whether the additional effort will provide information that will lead to better drill or not to drill or where to drill decisions.

BRIEF SUMMARY OF THE DISCLOSURE

The invention more particularly includes a method for evaluating the illumination/imaging of a subsurface geological formation of interest that is located beneath a velocity boundary or interface with a material having high velocity seismic propagating properties above it and a subjacent material having relatively slower velocity seismic propagating properties. The method includes creating a theorized target horizon representing the subsurface zone of interest and also creating a theorized velocity contrast horizon representing the subsurface velocity boundary. A velocity model is created representing the speeds at which seismic energy is expected to travel from the theorized target horizon up to and through the theorized velocity contrast horizon. A plurality of locations are selected along the theorized target horizon for critical reflection analysis and the propagation of seismic energy is calculated from each of the plurality of locations along at least one pair of respective trajectories satisfying Snell's law for arriving and departing wave paths to determine incidence angles for each path of the pair of trajectories at the theorized velocity contrast horizon. The incidence angles are compared to critical angles for each trajectory of the pair of trajectories, wherein the velocity contrast refracts the seismic energy to progress along the velocity contrast horizon such that the seismic energy intersecting the velocity contrast horizon at the critical angle is unlikely to progress to the earth's surface in a lateral range or at a strength to be meaningful for seismic prospecting. The number of pairs of trajectories are tabulated at each selected location where both trajectories are pre-critical, or less than the critical angle, in comparison to the number of pairs of trajectories where either or both of the trajectories of the pair are critical or post-critical, or equal to or greater than the critical angle wherein a pair is deemed pre-critical if each trajectory of the pair is pre-critical and wherein a pair is deem post-critical if either trajectory or both trajectories are post-critical. Finally, a display is created that identifies areas of the target horizon for which selected locations have more pairs of pre-critical trajectories and therefore fewer pairs of post-critical trajectories and also identifies areas of the target horizon for which selected locations have fewer pairs of pre-critical trajectories and therefore more pairs of post-critical trajectories, wherein the areas that have more pairs of pre-critical trajectories are likely to yield useful seismic data and areas that have fewer pairs of pre-critical trajectories are less likely to yield useful seismic data when recorded above the velocity contrast.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Seismic energy may sometimes be viewed as a ray, propagating down through the earth and bouncing and reflecting going back up to the surface. Analysis of seismic prospecting is often undertaken as ray tracing. However, ray tracing is somewhat simplifies what is actually occurring in the geology and two-way wave field propagation analysis provides better representation of the seismic energy propagation through subsurface geology. Example methods for two-way wave field propagation can be found in a number of publications including: Boore, D. M., 1972. Finite-difference methods for seismic waves, In: Methods in Computational Physics, Vol. 11, 1-37. Bolt B. A., ed., Academic Press, New York; Kelly, K. R., Ward, R. W., Treitel, S., and Alford, R. M., 1976. Synthetic Seismograms: a Finite-Difference Approach, Geophysics, 41, 2-27; Baysal, E., D. D. Kosloff, and J. W. C. Sherwood, 1983, Reverse-time migration: Geophysics, 48, 1514-1524; McMechan, G. A., 1983, Migration by extrapolation of time-dependent boundary values: Geophysical Prospecting, 31, 413-420; and Whitmore, D. N., 1983, Iterative depth imaging by back time propagation: 53rd Annual International Meeting, SEG, Expanded Abstracts, 382-385.

Figure 1:
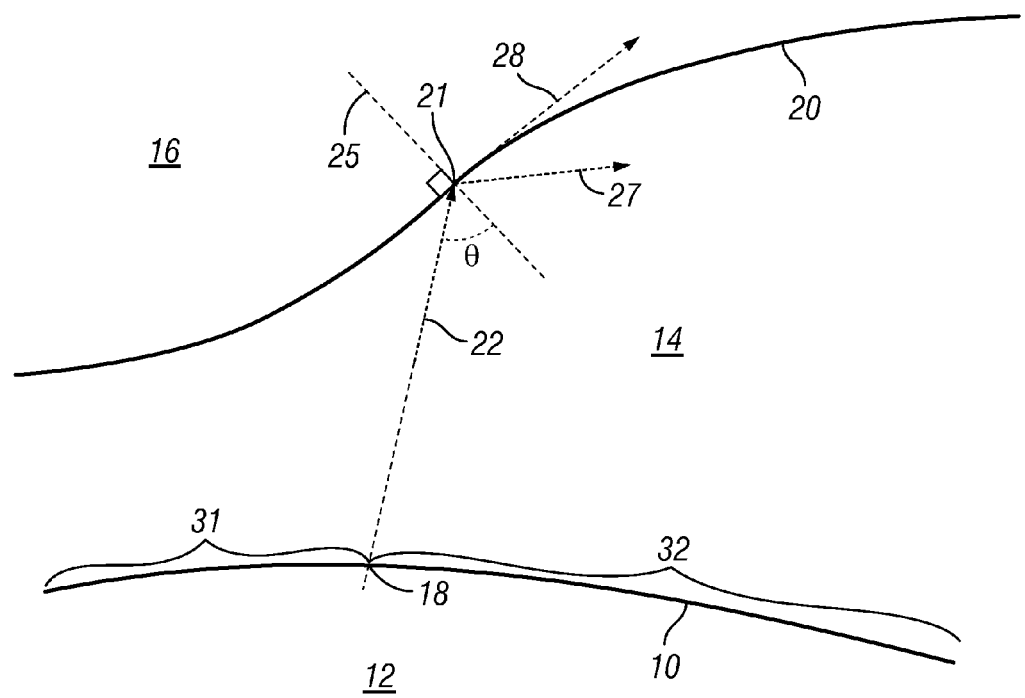
FIG. 1 is a diagram illustrating how seismic energy is viewed to transit from a point on a target horizon through the interface or boundary at the base of salt or other high velocity layer.

At the boundary/interface of two layers, seismic waves/rays may be seen to refract so that it bends to a slightly altered direction or reflects or rebounds to a new, substantially different direction. These refracting and reflecting properties generally follow Snell's law. However, when two layers have substantially different velocity properties for seismic energy, the reflecting and refracting properties are more pronounced or exaggerated. Since the interfaces or boundaries between layers of sediments and rock are rarely horizontal and quite often somewhat complicated, seismic energy can get somewhat distorted. For high velocity layers, the combination of complicated boundaries along with pronounced reflecting and refracting properties creates data sets that appear to be missing important information. Referring to FIG. 1, deep in the earth, geophysicists may be focused on a boundary between a first layer 12 and a second layer 14. The actual shape of the boundary is not known with certainty and has been postulated or theorized to have the shape shown as target horizon 10. The first layer 12 may be a porous sand layer through which hydrocarbons may migrate from lower source rock towards the surface. Layer 14 may be a sediment layer that is impervious and, thus, could seal the flow of hydrocarbons from further upward migration and cause the hydrocarbons to pool under the target horizon 10 at its highest levels. It is also known that overlying the target horizon 10 is a layer of high velocity materials 16, such as salt. The salt is known to be present and that a clear discernible boundary exists between the bottom of the salt and the layer below it. The shape of this boundary is typically not known with precision, but has been postulated or theorized to have the shape shown as velocity contrast horizon 20. Thus, while some information may be known about the target horizon 10, further information would be highly desirable to analyze and assess whether hydrocarbons are present, whether there are enough hydrocarbons accessible to justify the cost of drilling and producing the hydrocarbons and where to drill to maximize the recovery of the hydrocarbons.

In the example of FIG. 1, using the target horizon 10 and velocity contrast horizon 20, some helpful information about how seismic energy propagates through the velocity contrast horizon 20 from the target horizon 10 may be revealed. While seismic energy imposed at a perfect perpendicular angle to the interface may propagate straight through, any offset angle tends to cause problems. If the interface is not horizontal or parallel to the surface, such as at incident location 21, seismic energy coming straight up is refracted dramatically off course.

What has been found is that there is a critical angle beyond which the refracted seismic energy will not get to the surface. The critical angle is determined by the following formula:

$$\theta_c = \sin^{-1}(V_l/V_h)$$

where $\theta_c$=critical angle, $V_l$=velocity of the lower velocity material below and near the incident location, and $V_h$=velocity of the higher velocity material above and near the incident location.

The relative velocities of the higher and lower velocity materials may be fairly accurately estimated based on geology and/or core samples from nearby or relevant formations. Using the velocity contrast horizon 20 with its particular localized shape at the incident location 21, the critical angle $\theta_c$ may be determined relative to a line 25 that is normal to the velocity contrast horizon 20 at the incident location 21. Ray 22 represents seismic energy emanating from the target horizon 10 that arrives at incident location 21 at the critical angle $\theta_c$ and which may be seen emanating from the critical source point 18. Extending along target horizon 10 to the right of the critical source point 18 are a range of source points that are pre-critical or less than the critical angle as it relates to incident location 21. The pre-critical source points are identified by bracket 32. At the same time, extending along the target horizon to the left of the critical source point 18 are a range of source points that are post-critical or greater than the critical angle as it relates to incident location 21. The post-critical source points are identified by the bracket 31. Simply stated, any seismic energy emanating from post-critical source points 31 would not transit through incident location 21 to the surface while seismic energy from pre-critical source points 32 should transit through the incident point 21 and may arrive at the surface. The qualification "may arrive at the surface" recognizes that velocity contrast issues are not the only issues to create challenges for seismic prospecting.

At the critical angle, most of the energy associated with the ray 22 is reflected away along ray 27 and never reaches the surface. A trace amount of energy proceeds along ray 28, which propagates along the tangent direction of the bottom of salt 20 at the incident location 21 when ray 22 is at or beyond the critical angle. At the surface, this small amount of energy is barely detectable if it even reaches the surface.

The analytical process may be reversed to look at a single point on the target horizon 10 to consider where seismic energy may originate and where along the base of salt horizon 20 it may practically transit to arrive at the surface. Thus, dozens or hundreds of alternative incident locations may be considered for critical reflection analysis or critical angle analysis.

Figure 2:
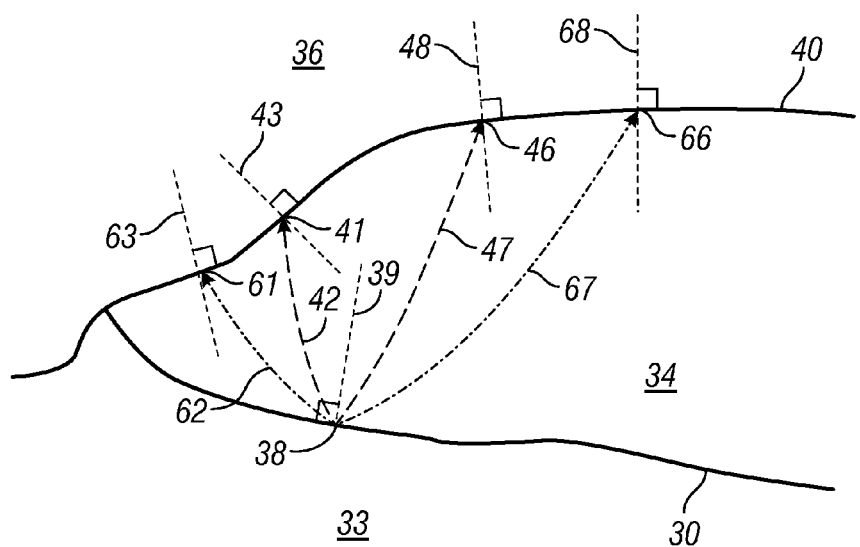
FIG. 2 is a diagram illustrating some of the analysis that is undertaken at various points on the target horizon and how the ray/wave paths are evaluated for critical angle considerations.

In a consideration illustrated in FIG. 2, it can be envisioned that a point is selected along target horizon 30, such as point 38. The target horizon 30 is a theorized or postulated horizon representing the boundary between a lower formation 33 and an intermediate formation 34. The analysis focuses on a number of paths for arriving and departing seismic energy to impact point 38 where the energy originates from the energy sources and returns to the receivers above the contrast. The seismic energy would arrive from a source and reflect from the point 38 at an angle opposite from line 39 that is normal to the horizon 30 at point 38 in accordance with Snell's law. Thus, the inbound seismic energy would arrive along a path such as ray 42 and depart along a path defined by ray 47. It should also be seen that a more offset source and receiver pair would define a path of seismic energy along rays 62 and 67. The analysis that would be undertaken in this example occurs at the velocity contrast horizon 40 between the high velocity upper formation 36 and the lower velocity intermediate formation 34 and specifically at the points 41, 46, 61 and 66. If the incident angles for the rays 42 and 47 are critical or post-critical at either of the points 41 and 46, then the seismic energy for this ray pair will not be expected to reach the surface. It is only when the incident angles for both rays are pre-critical will the ray pair be expected to potentially provide useful information in the seismic data record. Similarly, when considering points 61 and 66, if the incident angles for either of the rays 62 and 67 are critical or post-critical, then the ray pair will not be expected to reach the surface or provide useful information (and most likely no information) in the seismic data when recorded above the velocity contrast.

A point such as point 38 may be examined for hundreds of ray pairs with narrow incident angles and wide incident angles in a broad range of directions. It should be understood that FIG. 2 shows a two dimensional image of the respective horizons 30 and 40. While some complexity is seen in FIG. 2, there is likely to be a different complexity when considered in other views or azimuth angles; and the rays are in 3D with incident/outgoing angle and azimuth angle defining their unique direction. If many ray path pairs are found to be pre-critical angles at horizon 40, then it would be expected that seismic data for that point should have high probability to show in the seismic data record. If, on the other hand, many ray pairs are found to be critical or post-critical, then it should be expected that limited, if any data will appear in the data record. One big advantage of this type of analysis is the avoidance of further seismic prospecting with both the sources and receivers above the velocity contrast horizon 40 for areas where data is unlikely to be acquired. Seismic data acquisition is quite expensive along with the associated data processing and it would be particularly disappointing to spend a lot of time and money to get minimal or marginal new insights into a promising subsalt geology.

Figure 3:
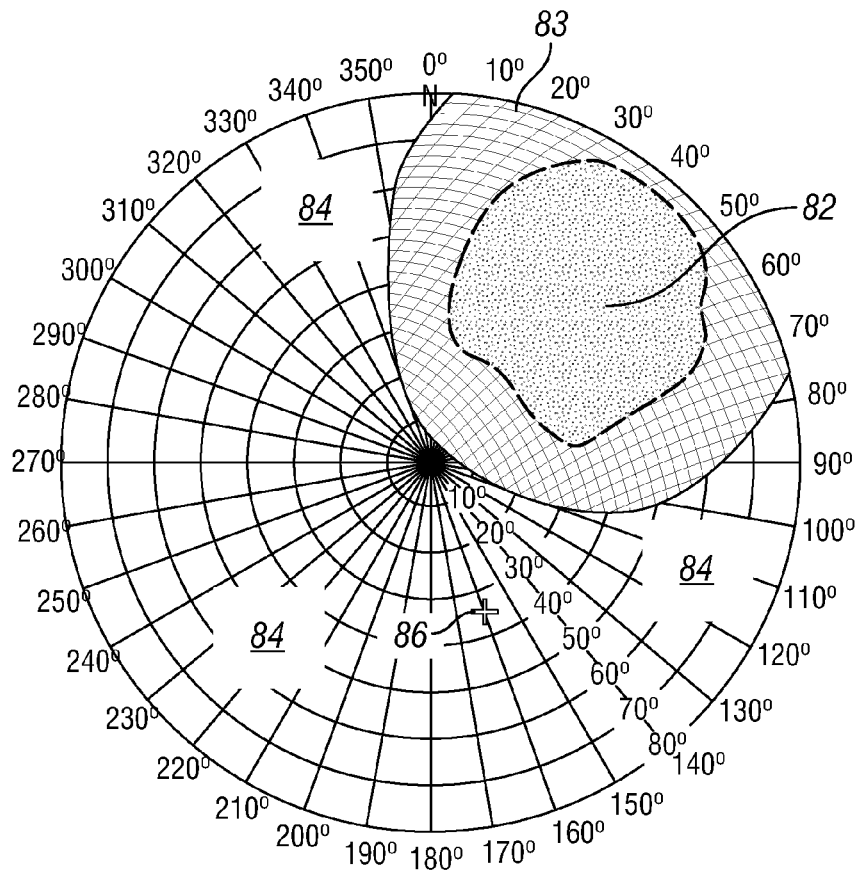
FIG. 3 is a rose diagram showing a single target point and the azimuth and dip angles for the hypothetical target horizon orientations for which useful seismic data will be theoretically available and horizons' azimuth and dip angles for which useful seismic data will not likely exist when recorded above the velocity contrast.

From the analysis of many rays, a rose diagram such as shown in FIG. 3 may be prepared. Specifically, at a specific point on the target horizon 10 or 30, one may develop hypothetical dip angles and dip azimuths of the target horizon 10 or 30 (or horizon orientations in 3D space) (for interpretation uncertainty analysis) and test those dip angles and dip azimuths to determine the probability of pre-critical and post-critical angles for these structures. Considering the localized shape of the target horizon, there is a range of pre-critical azimuths and angles identified by the number 82 showing solutions for the target horizon 10 or 30 that have a high probability of conveying seismic energy to the surface. There is an intermediate range of azimuths and angles for the target horizon 10 or 30 which are projected to provide some seismic energy to the surface that is labeled with the number 83. The remaining area identified with the number 84 is quite post-critical and minimal data is expected to be available if the target horizon has azimuth and dip angles shown. These rose diagrams are typically shown in color and may provide considerable variability in color and shade to help illuminate the highest, lowest and intermediate probabilities. Moreover, point 86 may be seen as representing the dip angle and azimuth of the current theorized target horizon which turns out to be quite post-critical. The rose diagram gives some indication of the degree that the localized shape of the velocity contrast horizons 20 and 40 would have to be wrong if seismic data were to be strongly acquirable for the point of the target horizon.

With significant computing power, this simple analysis may be repeated over and over to create data that may illustrate where on the target horizon 10 that high numbers of rays exist that have pre-critical angles at the velocity contrast horizon 20. Similarly, high numbers of post-critical angles may be aggregated and plotted to reveal locations that would not be likely to provide useful seismic information. For example, if two hundred ray pairs that started from a specific source point 38 on target horizon 30 were considered where the rays went in all directions based on the three dimensional theorized horizon 30 and only a few were found to be able to reach the surface due to incidence angle at velocity contrast horizon 40 at an angle greater than the critical angle, then it would be expected that very little indication would show up in the seismic record. On the other hand, if more than 90% of the ray pairs were to get to the surface, it is highly probably that the seismic data record should include useful image information at that point. Upon completion of this analysis, which can be quite intensive depending on the size of the area and the density of the investigation, the results can be compared to the processed seismic data and may also be used to determine whether to reprocess the data or design any follow-up or additional seismic survey acquisition.

Figure 4:
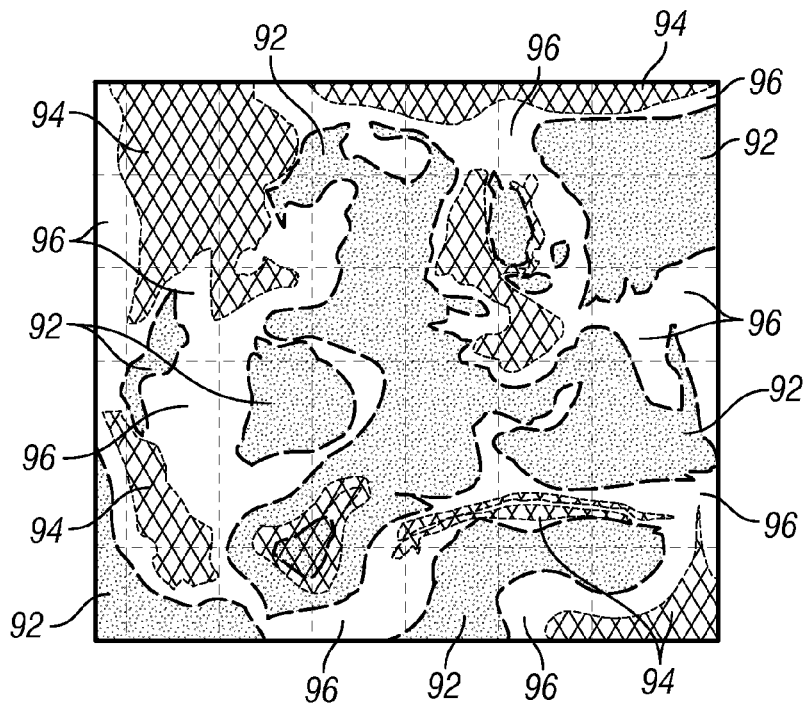
FIG. 4 is a map showing areas for which useful seismic data could be available and where seismic data is not likely available based on theoretical horizons for the target horizon and the base of salt horizon and the velocity model when recorded above the velocity contrast.

Entire maps may be created showing where data should be found and where data is not available as shown by FIG. 4. Specifically, after various points are studied, the data is tabulated and if large percentages of the numbers of ray pairs are pre-critical, these areas are identified by the areas 92 for which one would expect to be able to obtain useful data. At the same time, areas 94 should provide some data (although there are many other reasons that the data would be less than satisfactory) and areas 96 that are post-critical and where useful data is likely to be unobtainable.

A significant benefit of this invention is the avoidance of the expenditure of time and effort and financial expense to process existing data or seek out additional data for areas where it is highly desired to know more about the shape of formations and for which the information would tend to reduce risk for the eventual drilling of a well and where useful seismic data is really not available. However, when the existing seismic images have diminished information in areas where the analysis shown by FIG. 4 would indicate that data should have been available, then certain actions may be warranted. The existing data may be re-processed to draw out boundaries in the seismic images in areas where previous processing diminished such boundaries. Alternatively, more seismic data may be acquired for areas that should yield good data without acquiring data for low probability areas. Moreover, based on the information provided by the rose diagrams and maps such as in FIG. 4, drilling decisions may be made to drill or not to drill without wasting more time, energy and money to further study or seek more information.

Moreover, there is an option to perform an iterative process to consider changes to the either or both horizons or even to the velocity information about the nearby geology, where the shape of either horizon or velocity is changed, and the analytical process is recomputed to compare the previous results and displays to the new results and displays. Adjustments to the horizons or the velocity assumptions may be made when considering other information such as seismic images, core samples, geology, etc. Ultimately, the best information about the horizons will lead to the best analysis as to the presence and location of hydrocarbons.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method for evaluating the illumination of a subsurface geological formation of interest that is located beneath a velocity boundary or interface with a material having high velocity seismic propagating properties above it and a subjacent material having relatively slower velocity seismic propagating properties; the method comprising:

a) creating a theorized target horizon representing the subsurface zone of interest;
b) creating a theorized velocity contrast horizon representing the subsurface velocity boundary;
c) creating a velocity model representing the speeds at which seismic energy is expected to travel from the theorized target horizon up to and through the theorized velocity contrast horizon;
d) selecting a plurality of locations along the theorized target horizon for critical reflection analysis;
e) calculating the propagation of seismic energy from each of the plurality of locations along at least one pair of respective trajectories satisfying Snell's law for arriving and departing wave paths to determine incidence angles for each path of the pair of trajectories at the theorized velocity contrast horizon;
f) comparing the incidence angles for each trajectory of the pair of trajectories to one or more critical angles, wherein the velocity contrast refracts the seismic energy to progress along the velocity contrast horizon such that the seismic energy intersecting the velocity contrast horizon at the critical angle is unlikely to progress to the earth's surface in a lateral range or at a strength to be meaningful for seismic prospecting;
g) tabulating the number of pairs of trajectories at each selected location where both trajectories are pre-critical, or less than the critical angle, in comparison to the number of pairs of trajectories where either or both of the trajectories of the pair are critical or post-critical, or equal to or greater than at least one critical angle wherein a pair is deemed pre-critical if each trajectory of the pair is pre-critical and wherein a pair is deemed post-critical if either trajectory or both trajectories are post-critical; and
h) creating a display, critical reflection illumination map, that identifies areas of the target horizon for which selected locations have more pairs of pre-critical trajectories and therefore fewer pairs of post-critical trajectories and also identifies areas of the target horizon for which selected locations have fewer pairs of pre-critical trajectories and therefore more pairs of post-critical trajectories, wherein the areas that have more pairs of pre-critical trajectories are likely to yield useful seismic data and areas that have fewer pairs of pre-critical trajectories are less likely to yield useful seismic data when recorded above the velocity contrast.

2. The method according to claim 1, further including the step of reprocessing any existing seismic data in an effort to reveal information about the subsurface geology for areas with more pre-critical trajectories.

3. The method according to claim 1, further including the step of acquiring additional seismic data for areas with more pre-critical trajectories.

4. The method according to claim 1, further including the step of drilling a well in a location selected in part based on information revealed by critical reflection analysis.

5. The method according to claim 1, wherein the step of creating a velocity model further includes creating a model of other geological properties that may influence the propagation of seismic energy through subsurface materials.

6. The method according to claim 1, further including:
performing follow-up analytical process by slightly altering the theorized target horizon at one or more spots and re-performing the steps e) through h) in claim 1;
comparing the displays or resulting tabulations of pairs of pre-critical and post-critical trajectories for the unaltered theorized target horizon and the slightly altered theorized target horizon; and revising the theorized target horizon based on the above comparison along with consideration of any other information about the subsurface geology.

7. The method according to claim 6, more particularly including a multistep process of iteratively altering the theorized target horizon at one or more spots, re-performing the steps e) through h) in claim 1 and comparing to create a revised theorized target horizon.

8. The method according to claim 1, further including:

performing follow-up analytical process by slightly altering the theorized velocity contrast horizon at one or more spots and re-performing the steps e) through h) in claim 1;

comparing the displays or resulting tabulations of pairs of pre-critical and post-critical trajectories for the unaltered theorized velocity contrast horizon and the slightly altered theorized velocity contrast horizon; and revising the theorized velocity contrast horizon based on the above comparison along with consideration of any other information about the subsurface geology.

9. The method according to claim 8, more particularly including a multistep process of iteratively altering the theorized velocity contrast horizon at one or more spots, re-performing the steps e) through h) in claim 1 and comparing to create a revised theorized velocity contrast horizon.

10. The method according to claim 1, further including:

performing follow-up analytical process by slightly altering the velocity model and re-performing the steps e) through h) in claim 1;

comparing the displays or resulting tabulations of pairs of pre-critical and post-critical trajectories for the unaltered velocity model and the slightly altered velocity model; and revising the velocity model based on the above comparison along with consideration of any other information about the subsurface geology.

11. The method according to claim 10, more particularly including a multistep process of iteratively altering the velocity model at one or more spots, re-performing the steps e) through h) in claim 1 and comparing to create a revised velocity model.

12. The method according to claim 1, further including:

performing follow-up analytical process by slightly modifying the theorized target horizon at one or more spots and slightly altering the theorized velocity contrast horizon at one or more spots and re-performing the steps e) through h) in claim 1;

comparing the displays or resulting tabulations of pairs of pre-critical and post-critical trajectories for the unaltered horizons and the slightly altered horizons; and revising the horizons based on the above comparison along with consideration of any other information about the subsurface geology.

13. The method according to claim 12, more particularly including a multistep process of iteratively altering the horizons, re-performing the steps e) through h) in claim 1 and comparing to create a revised velocity model.

14. The method according to claim 1 wherein the velocity model is one of: an isotropic velocity model, a vertically transverse isotropic velocity model, a tilted transverse isotropic velocity model, orthorhombic anisotropy velocity model, other anisotropic model, an acoustic velocity model, an elastic velocity model, or other physical model.

15. The method according to claim 1 wherein the step of calculating the propagation of the seismic energy is done by ray tracing.

16. The method according to claim 1 wherein the step of calculating the propagation of the seismic energy is done by wave equations.

17. The method according to claim 1 wherein the critical angle is:

$$\theta_c = \sin^{-1}(V_l/V_h);$$

wherein $\theta_c$=critical angle, $V_l$=velocity of the lower velocity material below and near the incident location and $V_h$=velocity of the higher velocity material above and near the incident location.

18. The method according to claim 1, further including:

performing follow-up analytical process by creating a critical reflection illumination rose diagram at a single target point showing the azimuth and dip angles of the hypothetical target horizon orientations for which useful seismic data will be theoretically available and horizons' azimuth and dip angles for which useful seismic data will not likely exist when recorded above the velocity contrast.

19. The method of claim 1 wherein the display includes a critical reflection illumination rose diagram and map, shown in color and providing considerable variability in color and shade to help illuminate the highest, lowest and intermediate probabilities.

* * * * *